United States Patent [19]

Miyahara et al.

[11] 4,334,166

[45] Jun. 8, 1982

[54] ROTARY MAGNETIC SENSOR

[75] Inventors: Nobufumi Miyahara, Yokohama; Takashi Uchida, Hayama, both of Japan

[73] Assignee: Kanto Kasei Kogyo Kabushiki Kaisha, Kanagawa, Japan

[21] Appl. No.: 122,821

[22] Filed: Feb. 19, 1980

Related U.S. Application Data

[63] Continuation of Ser. No. 862,288, Dec. 19, 1977, abandoned.

[30] Foreign Application Priority Data

Jan. 19, 1977 [JP] Japan ................................. 52-4021
Jan. 19, 1977 [JP] Japan ................................. 52/4032

[51] Int. Cl.[3] .............................................. H02K 1/22
[52] U.S. Cl. ...................................... 310/268; 310/44
[58] Field of Search ................... 310/44, 45, 268, 156

[56] References Cited

U.S. PATENT DOCUMENTS 3,056,058  9/1962  Henry-Baudot ................... 310/268
3,668,585  6/1972  Johnson ............................ 310/44 X Primary Examiner—Donovan F. Duggan
Attorney, Agent, or Firm—Stevens, Davis, Miller & Mosher

[57] ABSTRACT

A rotary magnetic sensor for generating electrical signals corresponding to rotation of a shaft, which comprises a rotary disk or drum made of non-magnetic material, a magnet installed in the center of said disk or drum, a magnetic film applied on the disk or drum and connected to said magnet, a magnetic-film pattern formed in said magnetic film in which magnetic flux distribution is varied in the rotating direction of said rotary disk or drum, and a magnetic sensitive means disposed in the proximity of said magnetic-film pattern whereby electrical signals are generated in accordance with the rotation of said disk or drum.

10 Claims, 8 Drawing Figures

ROTARY MAGNETIC SENSOR

This is a continuation of application Ser. No. 862,288 filed Dec. 19, 1977, now abandoned.

BACKGROUND OF THE INVENTION

The present invention relates to a rotary magnetic sensor for magnetically detecting rotation of a rotary member such as a rotary shaft and for generating electrical signals, particularly electrical pulse signals, corresponding to the rotation of said rotary member.

Heretofore, rotary sensors of this kind have been roughly classified into brush systems and optical systems. The rotary sensor of the brush system is simple in construction but it is inferior in resolution and response characteristics and tends to degrade reliability due to mechanical wear since a sensor of this type relies upon the electrical contact of the sensor with a rotary member. The rotary sensor of the optical system is superior in resolution due to the application of optical techniques now widely used in the art. However, the rotary sensor of this type is adversely affected by mechanical shock, vibration, dusty environment and contamination by oil or the like, and the range of temperature where the sensor of this type can be employed is substantially limited.

In order to avoid the defects in the rotary sensors of the brush type and the optical type, a rotary magnetic sensor has been proposed. The rotary magnetic sensor heretofore proposed employs a disk made of magnetic material having slits cut around the periphery thereof or a disk made of non-magnetic material having one or more magnets or iron pieces embedded in the periphery thereof and a magnetic sensitive element combined with said disk to generate electrical signals in accordance with the rotation of the disk. The rotary magnetic sensor of the prior art has a simple construction and attains its purpose, but it is impossible in such conventional construction to provide a plurality of electrical signals, such as pulses, per one revolution of the disk.

DESCRIPTION OF THE INVENTION

It is an object of the present invention to provide a rotary sensor which eliminates all of the defects in the conventional rotary sensor.

It is another object of the present invention to provide a rotary magnetic sensor which can produce a plurality of electrical signals, such as pulses, per one revolution.

It is a further object of the present invention to provide a rotary magnetic sensor which can produce multi-channel electrical signals.

In accordance with the present invention, there is provided a rotary magnetic sensor comprising a rotary body made of non-magnetic material such as aluminum or synthetic resin, an annular magnet installed in the center of said rotary body, a magnetic film formed on the surface of said rotary body and magnetically connected with said annular magnet, a magnetic-film pattern formed in said magnetic film in which magnetic flux distribution is varied in the rotating direction of said rotary body and a magnetic sensitive means disposed in the proximity of said magnetic-film pattern whereby electrical signals corresponding to the rotation of said rotary body are generated.

The rotary member may be formed as a disk or a drum. In the disk type sensor, the magnetic-film pattern is formed in one or both side surfaces of the disk. In the drum type sensor, the magnetic-film pattern is formed in the perpheral surface of the drum or in both the peripheral surface and one or both side flat surfaces.

The magnetic-film pattern may be formed in the form of an annular track pattern which has no uniform magnetic film and has magnetic film portions projected thereinto from both sides thereof in alternate fashion in the rotating direction. One or more such annular track patterns may be formed in the magnetic film on a single disk or drum.

In addition to the annular track pattern or patterns, a magnetic-film pattern in the form of a slit or slits may be formed.

The magnetic-film pattern may be provided in the form of a slit or slits formed by removing some parts of said film at positions on a same circumference or circumferences, or at voluntary positions mutually spaced apart whereby the magnetic flux distribution is partly varied. Such slit or slits may be formed in the magnetic film on the flat side surface of the rotary member or on the peripheral surface thereof or on the both of them.

BRIEF DESCRIPTION OF THE DRAWINGS

The accompanying drawings illustrate several embodiments of the present invention, in which.

PREFERRED EMBODIMENTS

The accompanying drawings illustrate several embodiments of the present invention.

Figure 1A:
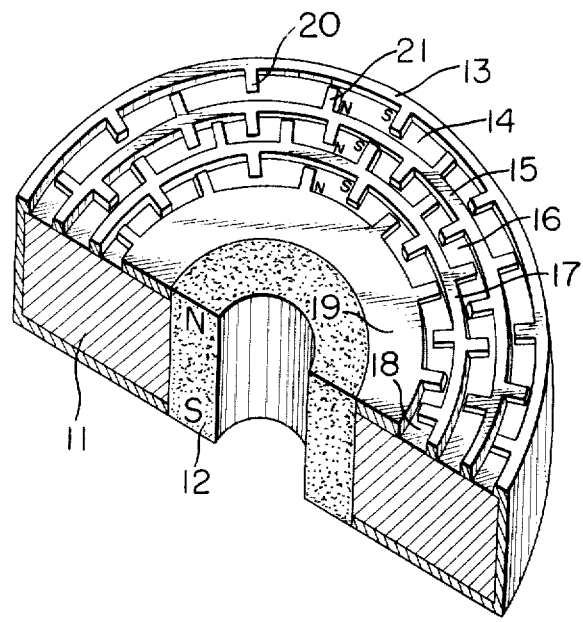
FIG. 1A is a sectional perspective view showing the rotary disk used in the first embodiment of the present invention.
Figure 1B:
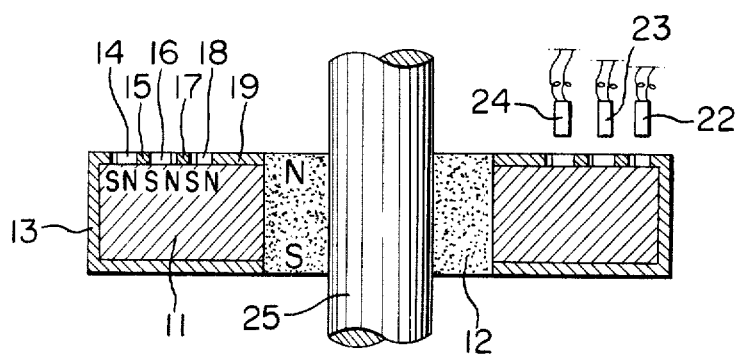
FIG. 1B is a sectional view showing the rotary disk shown in FIG. 1A combined with the magnetic sensitive elements.

Firstly, FIGS. 1A and 1B show the fundamental construction of the rotary disk according to the first embodiment of the present invention.

The rotary disk comprises a disk body 11 made of non-magnetic material such as aluminum or synthetic resin, an annular magnet 12 installed in the center of said disk and magnetized in the direction parallel to the rotating axis of the disk, annular magnetic films 13, 15, 17 and 19 applied on the flat surface of said disk body by electroless-plating or electroplating, vacuum evaporation, printing or like process and arranged in parallel with the rotating direction of said disk (i.e., arranged in the annular shape on the same circumference), that is, in concentric relation therewith, whereby track patterns 14, 16 and 18 having no uniform magnetic film are formed between said magnetic films, magnetic film portions 20 and 21 for detection being projected into each of said track patterns 14, 16 and 18 from both sides thereof in alternate fashion along the rotating direction, said innermost magnetic film 19 being in contact with one pole of said magnet 12 and said outermost magnetic film 13 being in contact with the other pole of said magnet 12 through a magnetic film covering the peripheral surface and the opposite flat surface of said disk body.

Assuming that the pole of the magnet 12 in contact with the magnetic film 13 is an S-pole, the magnetic film 13 is so magnetized that the S-pole is generated at the side facing the track pattern 14. Accordingly, an N-pole is induced at the side of the magnetic film 15 facing the track pattern 14 and an S-pole is induced at the side thereof facing the track pattern 16. In a similar manner, an N-pole is induced at the side of the magnetic film 17 facing the track pattern 16 and S-pole is induced at the side thereof facing the track pattern 18. Furthermore, N-pole is induced at the side of the magnetic film 19 facing the track pattern 18.

As described above, the magnetic film portions 20 and 21 for detection are integrally projected into the respective track patterns 14, 16 and 18 from both sides thereof in alternate fashion in the rotating direction. In the example assumed above, the projecting portions 20 constitute S-poles while the projecting portions 21 constitute N-poles, so that the distribution of magnetic flux in each of said track patterns varies in the direction of rotation of the disk. Accordingly, when magnetic sensitive elements 22, 23 and 24 are disposed in the proximity of the track patterns 14, 16 and 18, respectively, as shown in FIG. 1B, and the disk body 11 is rotated by a rotary shaft 25 fixed at the center thereof, the magnetic flux near the respective magnetic sensitive elements varies, so that electrical signals corresponding to the variation in magnetic flux distribution at the respective track patterns are produced.

Although three track patterns are formed on one surface of the disk in the embodiment shown in FIGS. 1A and 1B, one or any number of track patterns may be formed on the same disk. Furthermore, although the track patterns are shown on only one side of the disk, track patterns may be formed on both sides thereof. The arrangement in which the track patterns are formed on both sides of the disk, which is not shown in the drawings, may be prepared in the following manner. One side is prepared as shown in FIG. 1A while the other side is prepared in the same manner, and the outermost annular magnetic film on one side extends over the peripheral surface of the body 11 and integrally connects with the outermost annular magnetic film on the opposite side. The innermost annular magnetic films on both sides connect with the N- and S-poles of the magnet 12, respectively. In the other points, this arrangement is substantially same as that having annular films on one side of the disk.

Figure 2:
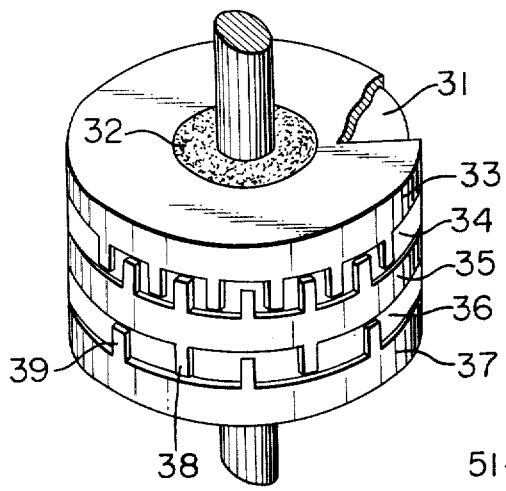
FIG. 2 is a partly broken perspective view showing the rotary drum used in the second embodiment.

FIG. 2 illustrates the fundamental construction of the rotary drum according to the second embodiment of the present invention. The rotary drum comprises a drum body 31 made of non-magnetic material, an annular magnet 32 installed in the center of said body 31 and magnetized in the direction parallel to the rotating axis of said body, annular magnetic films 33, 35 and 37 formed on the peripheral surface of said drum in parallel with the rotating direction of said drum whereby track patterns 34 and 36 having no uniform magnetic film are formed between the respective annular magnetic films, magnetic film portions 38 and 39 for detection being projected into each of said track patterns 34 and 36 from both sides thereof in alternate fashion along the rotating direction, the end ones of said annular magnetic films 33 and 37 being in contact with the opposite poles of said magnet 32 through magnetic films covering the opposite sides of the body 31, respectively. Magnetic sensitive elements (not shown) are arranged in the proximity of the respective track patterns 34 and 36. This rotary drum operates in the same manner as the rotary disk.

Figure 3:
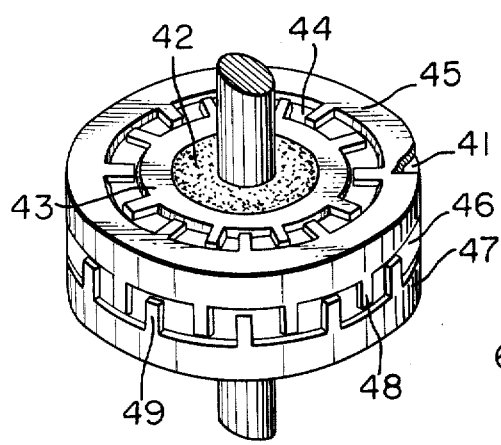
FIG. 3 is a partly broken perspective view showing the rotary drum used in the third embodiment.

FIG. 3 illustrates the fundamental construction of the rotary drum according to the third embodiment of the present invention, which corresponds to the combination of the first and second embodiments as explained above. The rotary drum according to this embodiment comprises a drum body 41 made of non-magnetic material, an annular magnet 42 installed in the center of said drum and magnetized in the direction in parallel with the rotating axis of said drum body, annular magnetic films 43 and 45 formed on the side surface of said body 41 in parallel with the rotating direction, that is, in concentric relation to said body and annular magnetic films 45 and 47 formed on the peripheral surface of said body 41 in parallel with the rotating direction.

In this construction, the film 45 on the side surface is integrally formed with the film 45 on the peripheral surface of the drum body. These annular magnetic films 43, 45 and 47 form track patterns 44 and 46 having no uniform magnetic film therebetween, and magnetic film portions 48 and 49 for detection are projected into the respective track patterns 44 and 46 from the both sides thereof in alternate fashion along the rotating direction. The innermost magnetic film 43 is in contact with one pole of said magnet 42 and the magnetic film 47 is in contact with the other pole of said magnet.

Magnetic sensitive elements (not shown) are disposed in the proximity of the track patterns 44 and 46, respectively. This rotary drum operates in the same manner as in the first and second embodiments as explained above.

Figure 4:
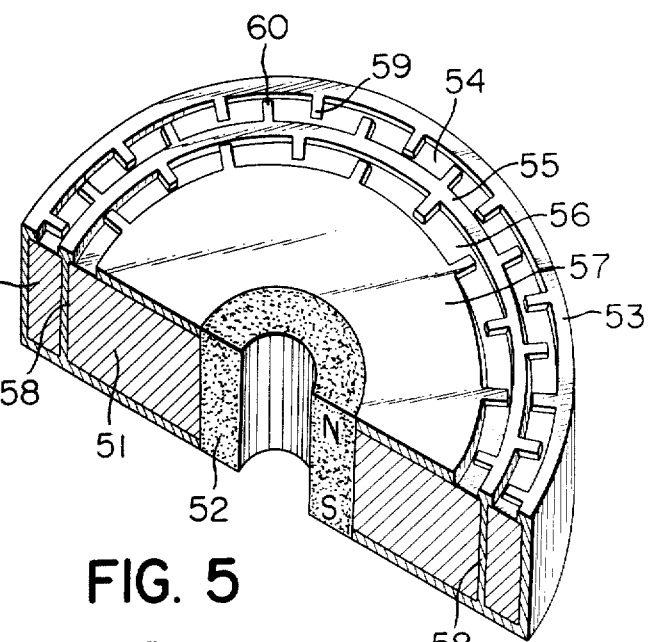
FIG. 4 is a sectional perspective view showing the rotary disk used in the fourth embodiment.

FIG. 4 illustrates the fundamental construction of a modified form of the rotary disk, according to the fourth embodiment of the present invention. The rotary disk comprises a disk body 51 made of non-magnetic material, an annular magnet 52 installed in the center of said disk body and magnetized in the direction parallel to the rotating axis of the disk, annular magnetic films 53, 55 and 57 formed on the flat surface of said body 51 and arranged in parallel with the rotating direction, that is, in concentric relation to the disk body, whereby track patterns 54 and 56 having no uniform magnetic film are formed between the annular magnetic films, magnetic film portions 59 and 60 for detection being projected into each of said track patterns 54 and 56 from both sides thereof in alternate fashion along the rotating direction, the innermost one of said magnetic film 57 being in contact with one pole of said magnet 52 and the outermost one of said magnetic film 53 being in contact with the other pole of said magnet 52 through a magnetic film formed on the peripheral surface and the opposite flat surface of said disk body. According to this embodiment, the annular magnetic film 55 and the magnetic film covering the whole surface of the opposite side are magnetically connected by magnetic means 58, which is formed through the disk body by plating process, mechanical process for pressing rods through said body or other suitable process, whereby the susceptibility of the magnetic film 55 is promoted so that the variation of the magnetic flux distribution is increased and thus the output of the magnetic sensitive elements is increased.

Figure 5:
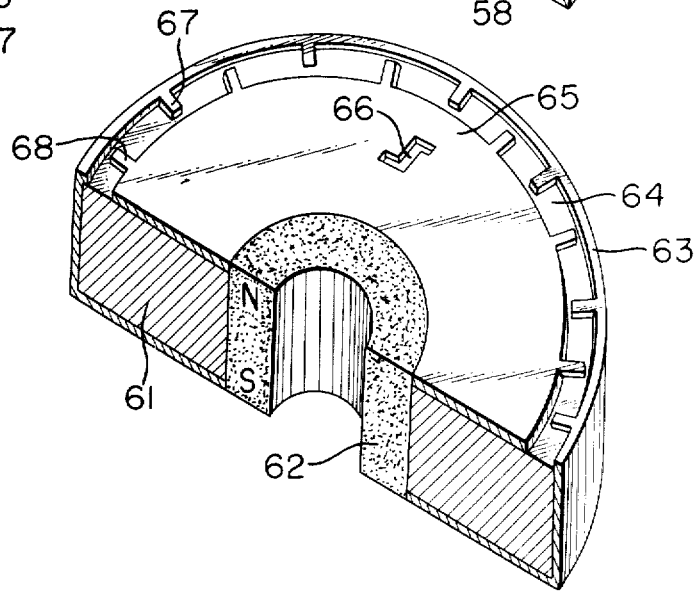
FIG. 5 is a sectional perspective view showing the rotary disk used in the fifth embodiment.

FIG. 5 illustrates the rotary disk according to the fifth embodiment of the present invention, which is designed to detect rotating angles. The rotary disk comprises a disk body 61 made of non-magnetic material, an annular magnet 62 installed in the center of said disk body and magnetized in the direction parallel to the rotating axis of the disk, annular magnetic films 63 and 65 formed on the flat surface of said body 61 by electroless-plating or electroplating process, vacuum evaporation, printing or other suitable process and arranged in parallel with the rotating direction, that is, in concentric relation to the disk body, whereby a track pattern 64 having no uniform magnetic film is formed between these magnetic films, magnetic film portions 67 and 68 for detection being projected into said track pattern 64 from both sides thereof in alternate fashion along the rotating direction, the inner one of said magnetic films 65 being in contact with one pole of said magnet 62 and the outer one of said magnetic films 63 being in contact with the other pole of said magnet 62 through a magnetic film covering the peripheral surface and the opposite flat surface of said disk body 61. This rotary disk operates in substantially same manner as that shown in FIGS. 1A and 1B.

According to the embodiment shown in FIG. 5, a pattern 66 having no magnetic film in the form of slit of any outline is formed in a part of the magnetic film 65 apart from the first track pattern 64. Around this slit pattern 66, the distribution of magnetic flux varies, depending on presence or absence of the magnetic film and, therefore, when a magnetic sensitive element (not shown) is disposed in the proximity of said slit pattern 66 and the disk body is rotated, electrical signals corresponding to the variation of the distribution of magnetic flux are produced.

Now, it is assumed, as a matter of convenience, that there are 360 sets of magnetic film portions 67 and 68 being alternately projected into the first track pattern 64 at equal distances and that there is one slit pattern 66. In this case, one set of the projecting magnetic film portions 67 and 68 corresponds to one degree of rotating angle, and therefore it is possible to easily detect the rotated angle of said disk by means of electrical signals, using the position of the slit pattern 66 as a reference.

Although one first track pattern and one slit pattern are shown in FIG. 5, a plurality of first track patterns as well as a plurality of slit patterns may be formed, without affecting the function obtained. The position of the slit pattern relative to the position of the projecting magnetic film portion in the first track pattern may be selected as desired. The modification as shown in FIG. 5 may be, of course, applied to the drum type construction.

Figure 6A:
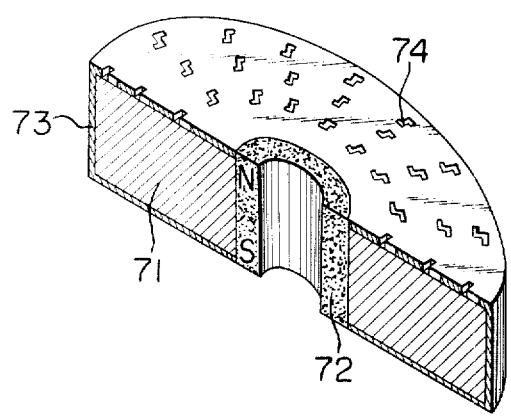
FIG. 6A is a sectional perspective view showing the rotary disk used in the sixth embodiment.
Figure 6B:
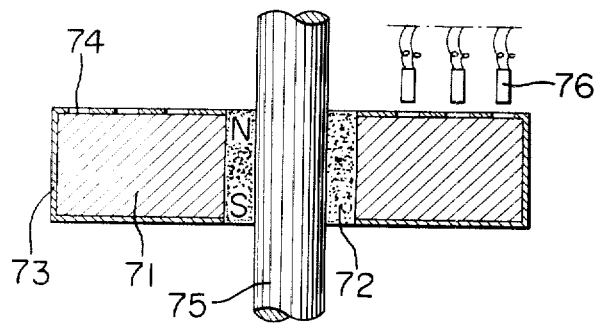
FIG. 6B is a sectional view showing the rotary disk shown in FIG. 6A combined with the magnetic sensitive elements.

FIGS. 6A and 6B illustrate the fundamental construction of the rotary disk, according to the sixth embodiment of the present invention. The rotary disk comprises a disk body 71 made of non-magnetic material such as aluminum or synthetic resin, an annular magnet 72 installed in the center of said disk body and magnetized in the direction parallel to the rotating axis of the disk, a magnetic film 73 formed on the disk body by electroless-plating or electroplating process, vacuum evaporation, printing or the like process, slit pattern 74 in said magnetic film on the flat surface of said disk, said slit pattern 74 being formed at positions on a same circumference or circumferences or at voluntary positions mutually spaced apart by equal angular distances in the rotating direction, whereby the distribution of magnetic flux on the flat surface of said disk is partly varied. When magnetic sensitive elements 76 are disposed in the proximity of said slit patterns on the flat surface of the disk and the disk body 71 is rotated by a shaft 75 fixed in the center of said body, the magnetic flux near the magnetic sensitive elements 76 varies, so that electrical signals corresponding to the variation in magnetic flux distribution are produced in the magnetic sensitive elements 76, and thus electrical signals corresponding to number of revolution or angle of rotation can be obtained.

Figure 7:
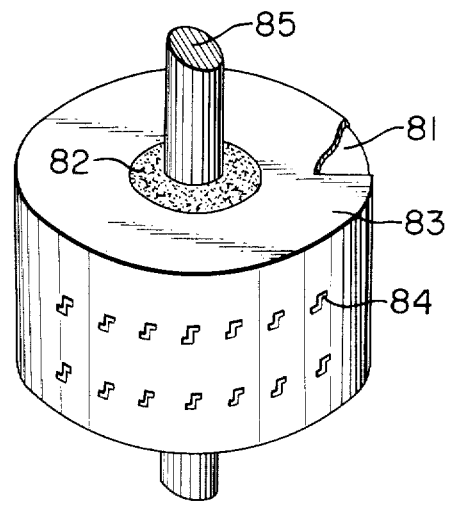
FIG. 7 is a partly broken perspective view showing the rotary drum used in the seventh embodiment.

FIG. 7 illustrates the fundamental construction of the rotary drum according to the seventh embodiment of the invention. The rotary drum comprises a drum body 81 made of non-magnetic material, an annular magnet 82 installed in the center of said drum body and magnetized in the direction parallel to the rotating shaft 85 fixed in said annular magnet, a magnetic film 83 formed on said drum body 81, slit patterns 84 in said magnetic film on the peripheral surface of said drum, said slit patterns 84 being formed at positions on a same circumference or circumferences or at voluntary positions mutually spaced apart by equal angular distances in the rotating direction, whereby the distribution of magnetic flux on the peripheral surface of said drum is partly varied. When magnetic sensitive elements (not shown) are disposed in the proximity of said slit patterns on the peripheral surface of the drum and the drum body 81 is rotated by means of the rotating shaft 85 fixed in the center thereof, the magnetic flux near the magnetic sensitive elements varies, so that electrical signals corresponding to the variation in magnetic flux distribution are produced in the magnetic sensitive elements, and thus electrical signals corresponding to the number of revolution or angle of rotation can be obtained.

Figure 8:
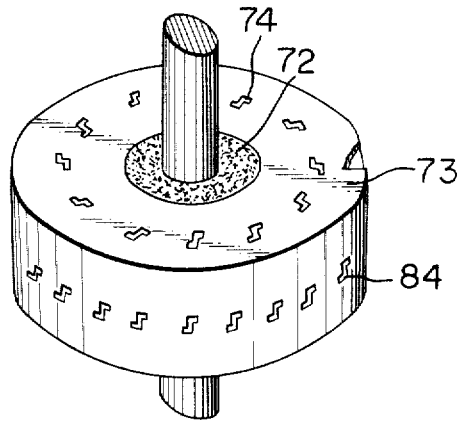
FIG. 8 is a partly broken perspective view showing the rotary drum used in the eighth embodiment.

FIG. 8 illustrate the eighth embodiment of the invention, which corresponds to the combination of the rotary disk shown in FIGS. 6A and 6B and the rotary drum shown in FIG. 7. In FIG. 8, same numerals as those used in FIGS. 6A, 6B or 7 indicate the corresponding parts in the construction shown in FIG. 8 which attain the same purpose.

In the embodiments as described above, the projecting magnetic portions for detection in the track pattern and/or the slit patterns are arranged at positions mutually spaced apart by equal angular distances in the rotating direction, but they may be arranged at any positions in the rotating direction, depending on the purpose to be attained.

Thus the present invention provides a rotary magnetic sensor of a single disk or a drum type in which electrical signals corresponding to the number of revolutions or the angle of rotation of a rotary shaft or a like rotating member are produced. The electrical signals thus produced are amplified and fed to wave-shaping circuits and digital pulse output signals are provided. It is possible to apply the electrical signals, produced in the above process, to an acoustic transducer, for example, a loudspeaker (using an amplifier), to produce sound corresponding to the track pattern or track patterns and/or slit patterns on the rotary disk or drum, and then this rotary magnetic sensor can also be used as an acoustic signal source of an alarm signal, discriminating signal or the like.

It will be understood that the present invention provides a rotary magnetic sensor of a single disk or drum construction, which can produce a plurality of electrical signals such as pulses per one revolution, which can be designed to provide a single track construction as well as a multitrack constructon, which can produce multichannel signals, thus providing an economical and practical construction, and which can be used for various purposes since the number of revolutions as well as the angle of rotation or the like can be detected.

The invention has been described in detail with reference to several preferred embodiments of the invention. However, this invention is not limited to those described embodiments and many changes and modifications may be made within the scope and the spirit of the present invention.

We claim:

1. A rotary magnetic encoder for magnetically detecting rotation and angular position of a rotary member and for generating electrical signals representing the rotation and angular position of said rotary member comprising a rotary body made of non-magnetic solid material, an annular magnet provided in the center of said rotary body for rotation with said body, a magnetic film formed on the surface of said rotary body having respective portions magnetically connected with opposite poles of said annular magnet, a magnetic-film pattern formed in said magnetic film in which magnetic flux distribution is varied in the rotating direction of said rotary body and a stationary magnetic detector disposed adjacent only a portion of the rotary path of said magnetic-film pattern for sensing changes in magnetic flux caused by said magnetic-film pattern as said pattern rotates with said rotary body past said detector and for generating electrical signals corresponding to the rotation and angular position of said rotary body.

2. A rotary magnetic sensor according to claim 1, in which the rotary body is formed in the form of a disk.

3. A rotary magnetic sensor according to claim 1, in which the rotary body is formed in the form of a drum.

4. A rotary magnetic sensor according to claim 2, in which the magnetic-film pattern is formed in one side surface of said disk.

5. A rotary magnetic sensor according to claim 2, in which the magnetic-film pattern is formed in both sides of said disk.

6. A rotary magnetic sensor according to claim 3, in which the magnetic-film pattern is formed in the peripheral surface of the drum.

7. A rotary magnetic sensor according to claim 6, in which the magnetic-film pattern is further formed in the flat side surface of said drum.

8. A rotary magnetic sensor according to claim 1, in which the magnetic-film pattern is formed in the form of at least one annular track pattern which has no uniform magnetic film and has magnetic film portions projected thereinto from both sides thereof in alternate fashion in the rotating direction of said rotary body.

9. A rotary magnetic sensor according to claim 8, in which the magnetic-film pattern contains at least one slit in the magnetic film in addition to the magnetic-film pattern formed as at least one annular track.

10. A rotary magnetic sensor according to claim 1, in which the magnetic-film pattern is provided in the form of at least one slit in the magnetic film provided at a selected position on the rotary body.

* * * * *